United States Patent
Takahashi

(10) Patent No.: US 11,221,269 B2
(45) Date of Patent: Jan. 11, 2022

(54) SIGNAL PROCESSING DEVICE AND SIGNAL PROCESSING METHOD

(71) Applicant: Yamaha Corporation, Shizuoka (JP)

(72) Inventor: Yu Takahashi, Shizuoka (JP)

(73) Assignee: YAMAHA CORPORATION, Shizuoka (JP)

( * ) Notice: Subject to any disclaimer, the term of this patent is extended or adjusted under 35 U.S.C. 154(b) by 236 days.

(21) Appl. No.: 16/440,453

(22) Filed: Jun. 13, 2019

(65) Prior Publication Data

US 2019/0293514 A1 Sep. 26, 2019

Related U.S. Application Data

(63) Continuation of application No. PCT/JP2017/044529, filed on Dec. 12, 2017.

(30) Foreign Application Priority Data

Dec. 16, 2016 (JP) .............................. JP2016-244212

(51) Int. Cl.
| | |
|---|---|
| *G01L 25/00* | (2006.01) |
| *H04B 1/10* | (2006.01) |
| *G01D 3/02* | (2006.01) |
| *G01D 5/16* | (2006.01) |
| *G01P 21/00* | (2006.01) |

(52) U.S. Cl.
CPC ................ *G01L 25/00* (2013.01); *G01D 3/02* (2013.01); *G01D 5/16* (2013.01); *H04B 1/1018* (2013.01); *G01P 21/00* (2013.01)

(58) Field of Classification Search
CPC . G01L 25/00; G01D 3/02; G01D 5/16; H04B 1/1018; G01P 21/00
See application file for complete search history.

(56) References Cited

U.S. PATENT DOCUMENTS

| | | | |
|---|---|---|---|
| 5,224,347 A | 7/1993 | Yakabe et al. | |
| 10,823,856 B2 * | 11/2020 | Raghupathy | ............ G01S 19/11 |
| 2004/0083528 A1 | 5/2004 | Stewart | |
| 2004/0200464 A1 | 10/2004 | Ikemoto | |

(Continued)

FOREIGN PATENT DOCUMENTS

| | | |
|---|---|---|
| CN | 105680807 A | 6/2016 |
| JP | S62-174644 A | 7/1987 |

(Continued)

OTHER PUBLICATIONS

International Search Report in PCT/JP2017/044529 dated Mar. 13, 2018.

(Continued)

*Primary Examiner* — Mischita L Henson
(74) *Attorney, Agent, or Firm* — Global IP Counselors, LLP

(57) ABSTRACT

A signal processing method includes receiving a signal that rises in response to a physical change and falls in response to an opposite physical change that is opposite to the physical change from a sensor that outputs the signal, and correcting a signal lag as either a rising of a received signal that has been received from the sensor lags with respect to a falling of the received signal, or the falling of the received signal lags with respect to the rising of the received signal.

12 Claims, 9 Drawing Sheets

(56) References Cited

U.S. PATENT DOCUMENTS

| | | |
|---|---|---|
| 2006/0016242 A1 | 1/2006 | Aust |
| 2012/0085176 A1* | 4/2012 | Morales .................. G01L 1/225 73/773 |
| 2013/0118267 A1 | 5/2013 | Suzuki et al. |
| 2016/0164550 A1 | 6/2016 | Pilgram |

FOREIGN PATENT DOCUMENTS

| | | |
|---|---|---|
| JP | H04-118708 A | 4/1992 |
| JP | 2004-316483 A | 11/2004 |
| JP | 4422728 B2 | 2/2010 |
| JP | 2013-104796 A | 5/2013 |
| JP | 2014178242 A | 9/2014 |
| JP | 2015-147038 A | 8/2015 |
| JP | 2016-136989 A | 8/2016 |

OTHER PUBLICATIONS

Translation of Office Action in the corresponding Chinese Patent Application No. 201780077816.6, dated Nov. 4, 2020.
Translation of Office Action in the corresponding Japanese Patent Application No. 2018-556684, dated Mar. 31, 2020.
An Office Action in the corresponding Chinese Patent Application No. 201780077816.6, dated May 10, 2021.

* cited by examiner

SIGNAL PROCESSING DEVICE AND SIGNAL PROCESSING METHOD

CROSS-REFERENCE TO RELATED APPLICATIONS

This application is a continuation application of International Application No. PCT/JP2017/044529, filed on Dec. 12, 2017, which claims priority to Japanese Patent Application No. 2016-244212 filed in Japan on Dec. 16, 2016. The entire disclosures of International Application No. PCT/JP2017/044529 and Japanese Patent Application No. 2016-244212 are hereby incorporated herein by reference.

BACKGROUND

Technological Field

The present invention relates to a signal processing device and a signal processing method.

Background Information

An expansion/contraction sensor that outputs a signal corresponding to expansion/contraction is known from the prior art. The expansion/contraction sensor comprises a measurement object (one example of an "object") whose electrical resistance changes (one example of a "physical change") with applied force. Thus, by measuring the electrical resistance of the measurement object, the expansion/contraction sensor can detect the expansion and contraction of the expansion/contraction sensor itself or the stress applied to the expansion/contraction sensor.

One example of such an expansion/contraction sensor is a CNT strain sensor that uses carbon nanotubes (hereinafter abbreviated as CNTs) as the measurement object (for example, refer to Japanese Laid-Open Patent Application No. 2013-104796 (Patent Document 1) or Japanese Laid-Open Patent Application No. 2015-147038 (Patent Document 2). A CNT has the property that the electrical resistance will change with applied force to the CNT. Thus, by measuring the electrical resistance of the CNTs provided in the CNT strain sensor, the expansion and contraction of the CNT strain sensor itself or the stress that is applied to the CNT strain sensor can be detected. In addition, another example of the expansion/contraction sensor is a braid-based sensor that employs a braid that expands and contracts using conductive fibers and rubber fibers as the measurement object, and that detects the amount of expansion and contraction of the braid by measuring the electrical resistance of the braid (refer to Shinya Namikawa and two others "Basic Investigation of Braid-Based Sensor Using Resistance Change in Response to Stretching," Interaction 2016 (Non-Patent Document 1)). Other examples of strain sensors are disclosed in, for example, Japanese Laid-Open Patent Application No. 2016-136989 (Patent Document 3) and Japanese Patent No. 4422728 (Patent Document 4).

In an expansion/contraction sensor that outputs an output signal whose signal level corresponds to the electrical resistance of a measurement object, such as a CNT strain sensor or a braid-based sensor, the output signal of the expansion/contraction sensor tends to be asymmetric in terms of expansion and contraction of the expansion/contraction sensor. That the output signal is asymmetric means that either the rising of the output signal is slowed down with respect to the falling of the output signal or the falling of the output signal is slowed down with respect to the rising of the output signal. For example, in the case of an expansion/contraction sensor in which the output signal rises in response to the expansion of the expansion/contraction sensor and the output signal falls in response to the contraction of the expansion/contraction sensor, the falling of the output signal will be slowed down with respect to the rising of the output signal. The cause of the time lag is thought to be that, due to, for example, the viscoelasticity of the rubber fibers, etc., provided in the expansion/contraction sensor, the expansion/contraction sensor tends to deform more gradually when the expansion/contraction sensor contracts compared to when the expansion/contraction sensor expands. The expansion/contraction sensor is often used as a wearable sensor for measuring the motion of the wearer, but there is the problem that the ability to follow the movement of the wearer is not the same during expansion and as during contraction.

SUMMARY

The present disclosure is made in view of the problem described above, and one object thereof is to eliminate asymmetry from the output signal of a sensor whose output signal is asymmetric in terms of the rise time in response to a physical change and the fall time in response to a physical change that is the opposite of said physical change.

A signal processing method according to this disclosure comprises receiving a signal that rises in response to a physical change and falls in response to an opposite physical change that is opposite to the physical change from a sensor that outputs the signal, and correcting a signal lag as either a rising of a received signal that has been received from the sensor lags with respect to a falling of the received signal or the falling of the received signal lags with respect to the rising of the received signal.

A signal processing device according to this disclosure comprises a receiver configured to receive a signal that rises in response to a physical change and falls in response to an opposite physical change that is opposite to the physical change from a sensor that outputs the signal, and a signal processor configured to correct a signal lag as either a rising of a received signal received by the receiver lags with respect to a falling of the received signal or the falling of the received signal lags with respect to the rising of the received signal.

DETAILED DESCRIPTION OF THE EMBODIMENTS

Selected embodiments will now be explained with reference to the drawings. It will be apparent to those skilled in the field of musical performances from this disclosure that the following descriptions of the embodiments are provided for illustration only and not for the purpose of limiting the invention as defined by the appended claims and their equivalents.

A: First Embodiment

Figure 1:
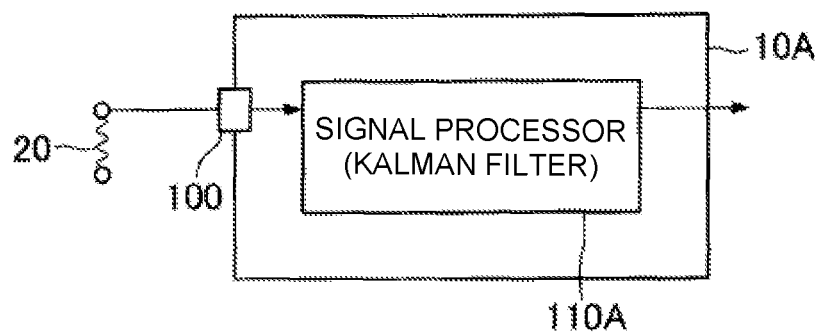
FIG. 1 is a view illustrating a configuration example of a signal processing system that includes a signal processing device 10A according to a first embodiment.

FIG. 1 is a view illustrating a configuration example of a signal processing system that includes a signal processing device 10A according to a first embodiment. A wearable sensor using an expansion/contraction sensor (stretchable sensor) 20, such as a data glove for motion capture, is connected to the signal processing device 10A. The signal processing device 10A is a microprocessor such as a Digital Signal Processor (DSP). The signal processing device 10A performs processing unique to the first embodiment on the output signal of the expansion/contraction sensor 20 and outputs the processed output signal. The signal processing device 10A can be, instead of the DSP, a CPU (Central Processing Unit) having at least one processor and the like. In addition, the signal processing device 10A can include a plurality of CPUs. The expansion/contraction sensor 20 in the present embodiment is a CNT strain sensor. The expansion/contraction sensor 20 is provided with CNTs, which constitute a measurement object (one example of an object disposed in a sensor). Then, the expansion/contraction sensor 20 outputs a signal that rises with an expansion of the expansion/contraction sensor 20 (one example of a physical change) and that falls with a contraction of the expansion/contraction sensor 20 (one example of an opposite physical change). The physical change and the opposite physical change can be, for example, changes in electrical resistance of the CNTs disposed in the sensor 20.

Figure 2:
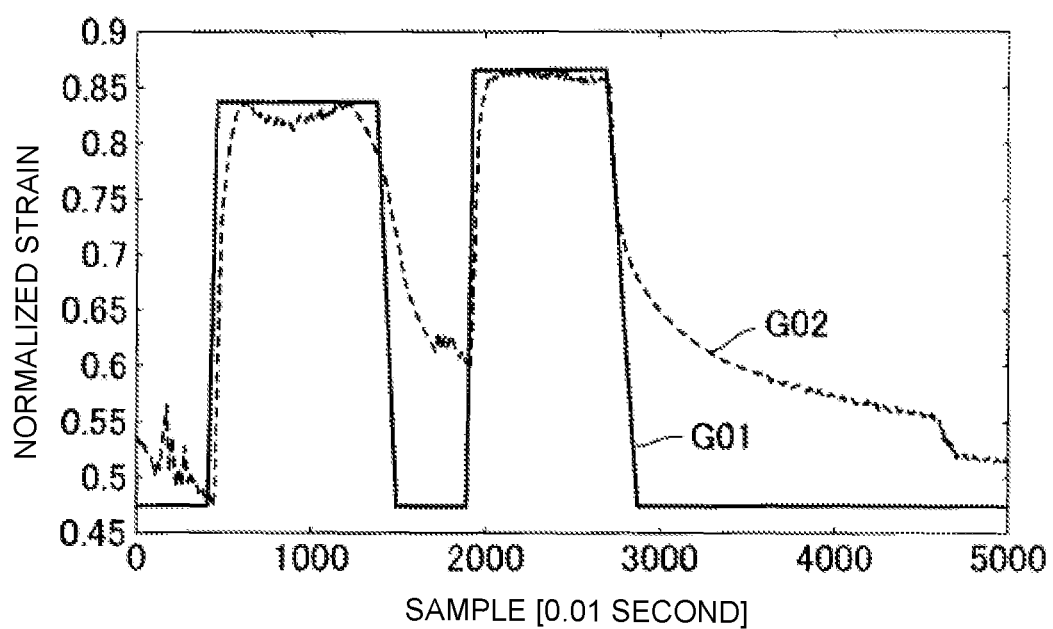
FIG. 2 is a view showing one example of an output signal waveform of an expansion/contraction sensor 20 included in the signal processing system.

The output signal of the expansion/contraction sensor 20 becomes asymmetric when the expansion/contraction sensor 20 expands and contracts. Specifically, in the present embodiment, the trailing edge of the output signal of the expansion/contraction sensor 20 lags (is slowed down) relative to the leading edge of the output signal. FIG. 2 is a view showing one example of an ideal output signal waveform and an actual output signal waveform of the expansion/contraction sensor 20. In FIG. 2, the ideal output signal waveform is represented by waveform G01 and the actual output signal waveform is represented by waveform G02. As is apparent from a comparison of waveform G01 and waveform G02 of FIG. 2, although the leading edges of the actual output signal waveform and the ideal output signal waveform are essentially coincident, the trailing edge of the actual output signal waveform is slowed down relative to the trailing edge of the ideal output signal waveform.

The signal processing device 10A of the present embodiment is a device for correcting the asymmetry of the output signal of the expansion/contraction sensor 20. Specifically, the signal processing device 10A of the present embodiment corrects the slowing down of the falling of the output signal of the expansion/contraction sensor 20.

As illustrated in FIG. 1, the signal processing device 10A includes a receiver 100 and a signal processor 110A. The receiver 100 in the present embodiment is an input terminal (connector, port, or the like) for electrically connecting the expansion/contraction sensor 20 via a signal line or the like. However, the signal processing device 10A and the expansion/contraction sensor 20 can also be configured to be wirelessly connected by adopting a circuit such as a wireless communication circuit as the receiver 100. In short, the receiver 100 can be any means for receiving the output signal of the expansion/contraction sensor 20. The receiver 100 sends the signal received from the expansion/contraction sensor 20 to the signal processor 110A. The signal processor 110A refers to hardware that executes software programs and subjects the signal received from the receiver 100 to signal processing for correcting the slowing down of the fall of the signal and outputs the signal to a downstage device. The signal processor 110A is, for example, a processing circuit. In the present embodiment, assuming that the expansion/contraction sensor 20 includes a measurement object, such as a CNT, and a viscoelastic material, such as rubber, the expansion/contraction sensor 20 can be modeled as the standard linear solid model shown in FIG. 3. The signal processor 110A according to the present embodiment executes a Kalman filtering process for correcting the asymmetry of the output signal of the expansion/contraction sensor 20 using a Kalman filter determined based on the standard linear solid model that models the expansion/contraction sensor 20. The signal processing device 10A can further include memory such as a program memory and data memory that the signal processor 110A can access.

Figure 3:
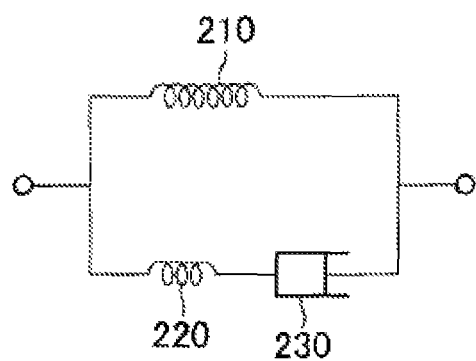
FIG. 3 is a view showing one example of a standard linear solid model corresponding to the expansion/contraction sensor 20.

As illustrated in FIG. 3, in the standard linear solid model employed in the present embodiment, the expansion/contraction sensor 20 includes an elastic element 210, such as a linear spring, an elastic element 220, such as a linear spring, connected in parallel with the elastic element 210, and an inertial element 230, such as a dashpot, connected in series with the elastic element 220. Hereinbelow, the spring coefficient of the elastic element 210 is represented by "$E_1$," the spring coefficient of the elastic element 220 is represented by "$E_2$," and the coefficient of viscosity of the inertial element 230 is represented by "$\eta$." In addition, the reception period of the output signal of the expansion/contraction sensor 20 of the receiver 100 is represented by "$\Delta_t$." The time length of "$\Delta_t$" can be, for example, from time (t−1) to time t.

In this case, as shown in Equation (1) below, in the standard linear solid model, the strain ε(t), which indicates the magnitude of the expansion/contraction of the expansion/contraction sensor 20 at time t, can be represented by the strain ε(t−1) of the expansion/contraction sensor 20 at time (t−1), the stress σ(t) applied to the expansion/contraction sensor 20 at time t, and the stress σ(t−1) applied to the expansion/contraction sensor 20 at time (t−1).

Equation $$\varepsilon(t) = \frac{\Delta_t \eta}{(E_1+E_2)\eta + E_1 E_2 \Delta_t} \left\{ \left(\frac{1}{\Delta_t} + \frac{E_2}{\eta}\right)\sigma(t) - \frac{1}{\Delta_t}\sigma(t-1) \right\} + \frac{(E_1+E_2)\eta}{(E_1+E_2)\eta + E_1 E_2 \Delta_t}\varepsilon(t-1) \quad (1)$$

Equation (1) can be expressed as Equation (6) below, where coefficient $\alpha_1$, coefficient $\alpha_2$, coefficient $\alpha_3$, and coefficient $\alpha_4$ are respectively defined by the following Equations (2)-(5).

Equations $$\alpha_1 = \frac{\Delta_t \eta}{(E_1 + E_2)\eta + E_1 E_2 \Delta_t} \quad (2)$$

$$\alpha_2 = \frac{1}{\Delta_t} + \frac{E_2}{\eta} \quad (3)$$

$$\alpha_3 = \frac{1}{\Delta_t} \quad (4)$$

$$\alpha_4 = \frac{(E_1 + E_2)\eta}{(E_1 + E_2)\eta + E_1 E_2 \Delta_t} \quad (5)$$

$$\varepsilon(t) = \alpha_1 \alpha_2 \sigma(t) - \alpha_1 \alpha_3 \sigma(t-1) + \alpha_4 \varepsilon(t-1) \quad (6)$$

Then, Equation (7) below can be derived from Equation (6), where a normal random number that indicates a disturbance applied to the strain $\varepsilon(t)$ at time t is "$e_\varepsilon$" and a normal random number indicating a disturbance applied to the stress $\sigma(t+1)$ at time (t+1) is "$e_\sigma$". In the present embodiment, the following Equation (7) is employed as a state equation of the Kalman filter used in the signal processor 110A. That is, in the Kalman filter according to the present embodiment, the state equation in which the strain $\varepsilon(t)$, stress $\sigma(t+1)$, and stress $\sigma(t)$ are state variables is employed, as shown in the following Equation (7).

Equation $$\begin{bmatrix} \varepsilon(t+1) \\ \sigma(t+2) \\ \sigma(t+1) \end{bmatrix} = \begin{bmatrix} \alpha_4 & \alpha_1 \alpha_2 & -\alpha_1 \alpha_3 \\ 0 & 1 & 0 \\ 0 & 1 & 0 \end{bmatrix} \begin{bmatrix} \varepsilon(t) \\ \sigma(t+1) \\ \sigma(t) \end{bmatrix} + \begin{bmatrix} e_\varepsilon \\ e_\sigma \\ 0 \end{bmatrix} \quad (7)$$

In addition, in the present embodiment, the following Equation (8) is employed as an observation equation in the Kalman filter used in the signal processor 110A. Here, the value "R(t)" in the Equation (8) is the electrical resistance converted from the voltage value represented by the output signal of the expansion/contraction sensor 20 at time t. In addition, the value "c" in the Equation (8) is a coefficient that relates the electrical resistance R(t) to the strain $\varepsilon(t)$ generated in the expansion/contraction sensor 20.

Equation $$[R(t)] = \begin{bmatrix} c & 0 & 0 \end{bmatrix} \begin{bmatrix} \varepsilon(t) \\ \sigma(t+1) \\ \sigma(t) \end{bmatrix} + [e_\varepsilon] \quad (8)$$

The signal processor 110A uses the electrical resistance R(t) represented by the output signal of the expansion/contraction sensor 20 as an input and executes the Kalman filter process according to Equations (7) and (8). As a result, the signal processor 110A updates the state variables ($\varepsilon(t)$, $\sigma(t+1)$, $\sigma(t)$) such that, for example, the expected squared error of the estimated values of the state variables ($\varepsilon(t)$, $\sigma(t+1)$, $\sigma(t)$) is minimized. The signal processor 110A then outputs the stress $\sigma(t)$, which is the state variable updated by the Kalman filtering process, to a downstage device.

Figure 4:
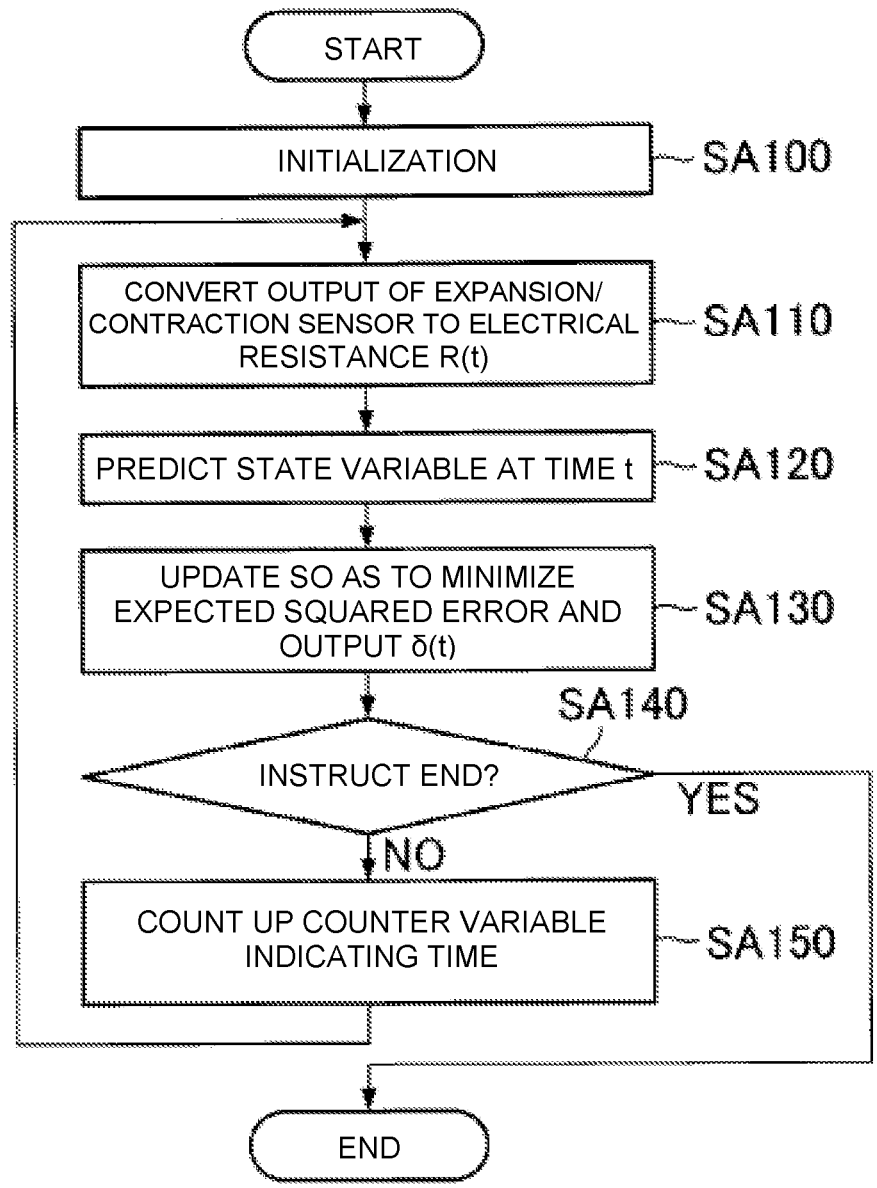
FIG. 4 is a flowchart illustrating the flow of a Kalman filter process that is executed by a signal processor 110A of the signal processing device 10A.

FIG. 4 is a flowchart illustrating a flow of the Kalman filter process that is executed by the signal processor 110A.

As illustrated in FIG. 4, the signal processor 110A first carries out an initialization process (SA100). Specifically, in Step SA100, the signal processor 110A sets a counter variable indicating the time t, the disturbances $e_\varepsilon$ and $e_\sigma$, and the state variables ($\varepsilon(t-1)$, $\sigma(t)$, $\sigma(t-1)$) to initial values.

In addition, the signal processor 110A converts the voltage value represented by the output signal of the expansion/contraction sensor 20 at time t indicated by the counter variable into the electrical resistance R(t) (SA110).

The signal processor 110A calculates the state variables ($\varepsilon(t)$, $\sigma(t+1)$, $\sigma(t)$) according from state variables ($\varepsilon(t-1)$, $\sigma(t)$, $\sigma(t-1)$) using Equation (7), and stores the calculation result in a storage device (not shown) such as a memory (SA120).

Then, the signal processor 110A updates the state variables ($\varepsilon(t)$, $\sigma(t+1)$, $\sigma(t)$) calculated in Step SA120 based on the observation equation represented by the Equation (8) and the electrical resistance R(t) calculated based on the output signal of the expansion/contraction sensor 20 in Step SA110, and, from the updated state variables ($\varepsilon(t)$, $\sigma(t+1)$, $\sigma(t)$), outputs the stress $\sigma(t)$ to a downstage device (SA130). Specifically, for example, in Step SA130, the signal processor 110A first applies the state variables ($\varepsilon(t)$, $\sigma(t+1)$, $\sigma(t)$) calculated in Step SA120 to Equation (8) to thereby calculate the estimated value of the electrical resistance R(t). Secondly, for example, the signal processor 110A calculates the difference between the estimated value of the electrical resistance R(t) and the electrical resistance R(t) calculated based on the output signal of the expansion/contraction sensor 20 as an observation residual. Thirdly, the signal processor 110A updates the state variables ($\varepsilon(t)$, $\sigma(t+1)$, $\sigma(t)$) calculated in Step SA120 using the observation residual to thereby calculate the updated state variables ($\varepsilon(t)$, $\sigma(t+1)$, $\sigma(t)$).

The signal processor 110A then determines whether the end of the Kalman filtering process has been instructed by an operation of an operating module (not shown) or the like (SA140). If the determination result of Step SA140 is "Yes," the signal processor 110A ends the Kalman filter process. If the determination result of Step SA140 is "No," the signal processor 110A increments the counter variable representing the time t by one (SA150), and advances the process to Step SA110.

The foregoing is the configuration of the signal processing device 10A according to the present embodiment.

Figure 5:
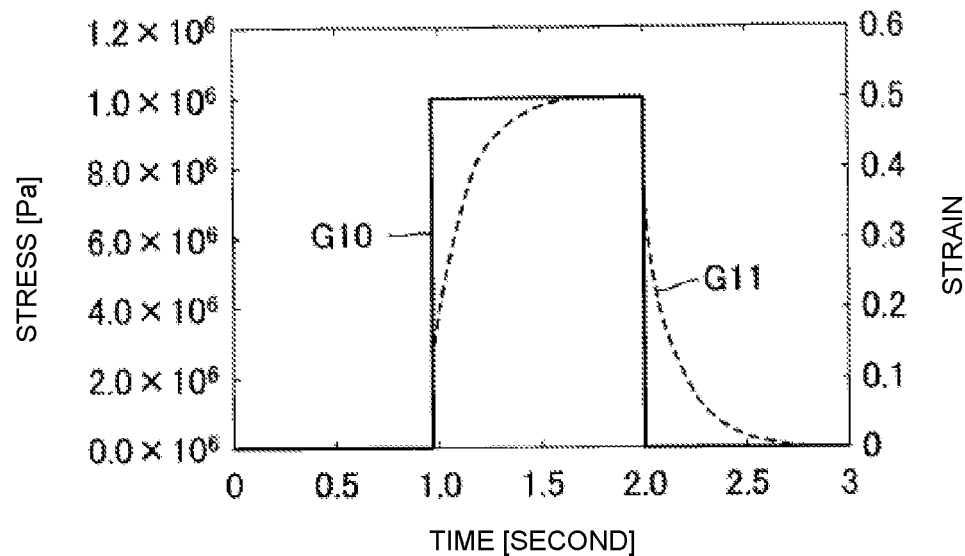
FIG. 5 is a view for explaining data used in a simulation for evaluating the effect of the present embodiment.

The inventor of the present application calculated the strain that is generated in the expansion/contraction sensor 20 when time-dependent stress, as shown in waveform G10 of FIG. 5, is applied to the expansion/contraction sensor 20 modeled as the standard linear solid model shown in FIG. 3. The waveform G11 shown in FIG. 5 represents the strain corresponding to the output signal that is output from the expansion/contraction sensor 20 when stress represented by the waveform G10 of FIG. 5 is applied to the expansion/contraction sensor 20 modeled as the standard linear solid model shown in FIG. 3. The inventor of the present application carried out a simulation in which, when strain represented by the waveform G11 is input to the signal processor 110A as the observation value, the stress that is applied to the expansion/contraction sensor 20 is estimated based on said observation.

In the standard linear solid model according to said simulation, the spring coefficient $E_1$, the spring coefficient $E_2$, and the coefficient of viscosity η were set to $E_1=2.0\times10^6$ [Pa], $E_2=5.5\times10^6$ [Pa], and η=$2.3\times10^5$ [Pa·s]. Hereinbelow, there are case in which the spring coefficient $E_1$, the spring coefficient $E_2$, and the coefficient of viscosity η are collectively referred to as model parameters.

Figure 6:
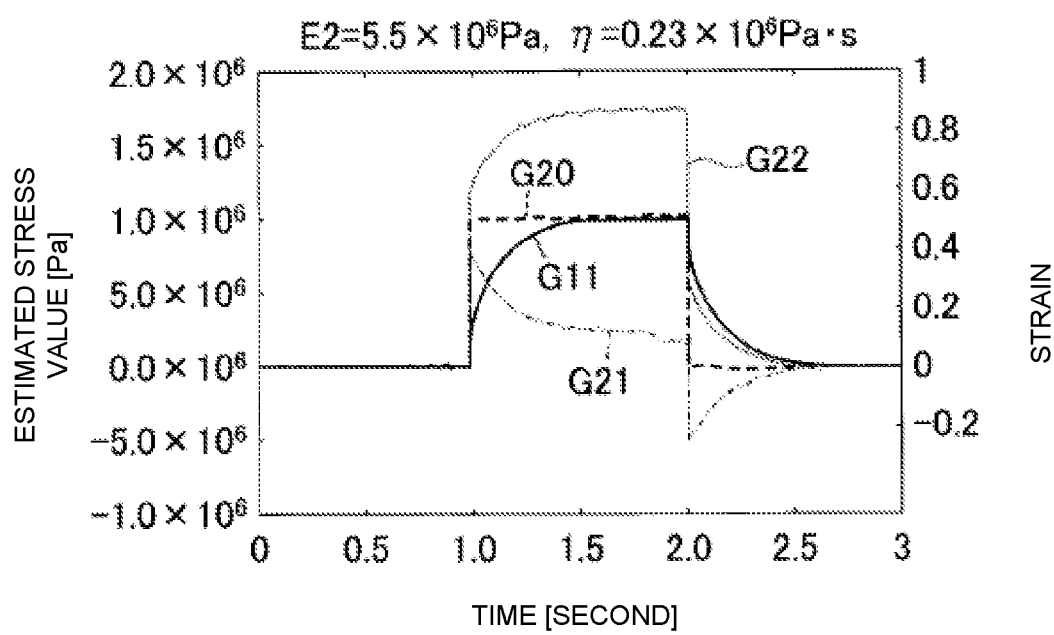
FIG. 6 is a view illustrating the simulation result.

FIG. 6 shows the same waveform G11 shown in FIG. 5, as well as waveforms G20-G22, which represent estimated values (hereinafter referred to as "estimated stress value") of the stress calculated by providing the observation value of the strain represented by said waveform G11 to the signal processing device 10A. In the calculation of the estimated stress value in FIG. 6, a case was assumed in which the true values of the model parameters $E_2$ and η are provided to the signal processor 110A. That is, in the calculation of the estimated stress value in FIG. 6, the model parameters $E_2$ and η were set to $E_2=5.5\times10^6$ [Pa], and η=$2.3\times10^5$ [Pa·s].

In addition, in the calculation of the estimated stress value in FIG. 6, both a case in which the true value of the model parameters $E_1$ is provided to the signal processor 110A and a case in which a value different than the true value of the model parameter $E_1$ is provided thereto were assumed. Specifically, when the estimated stress value represented by the waveform G20 was calculated, the model parameter $E_1$ was set to the true value, that is, $E_1=2.0\times10^6$ [Pa]. On the other hand, when the estimated stress value represented by the waveform G21 was calculated, the model parameter $E_1$ was set to a value different than the true value, that is, $E_1=0.5\times10^6$ [Pa], and when the estimated stress value represented by the waveform G22 was calculated, the model parameter $E_1$ was set to a value different than the true value, that is, $E_1=3.5\times10^6$ [Pa].

As is apparent from a comparison between the waveform G20 in FIG. 6 and the waveform G10 in FIG. 5, it can be seen that if, in addition to the values of the model parameters $E_2$ and η, the value of $E_1$ is also a true value, the stress applied to the expansion/contraction sensor 20 represented by the waveform G10 is being accurately estimated. Then, as is apparent from a comparison between the waveforms G20, G21, and G22 in FIG. 6, as the deviation of the value of the model parameter $E_1$, provided to the signal processor 110A, from the true value becomes larger, the error between the estimated stress value calculated by the signal processor 110A and the stress that is actually applied to the expansion/contraction sensor 20 represented by the waveform G10 also becomes larger.

Figure 7:
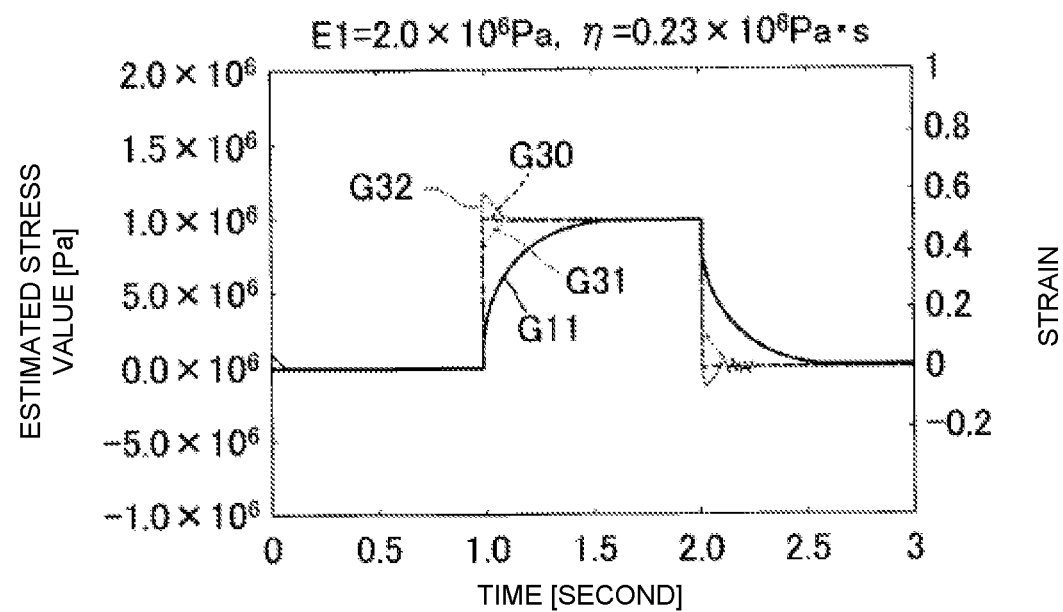
FIG. 7 is a view illustrating the simulation result.

FIG. 7 shows the waveform G11, as well as waveforms G30-G32, which represent estimated stress values. In the calculation of the estimated stress values in FIG. 7, a case was assumed in which the true values of the model parameters $E_1$ and η are provided to the signal processor 110A. That is, in the calculation of the estimated stress value in FIG. 7, the model parameters $E_1$ and η were set to $E_1=2.0\times10^6$ [Pa], and η=$2.3\times10^5$ [Pa·s].

In addition, in the calculation of the estimated stress values in FIG. 7, with respect to the signal processor 110A, when the estimated stress value represented by the waveform G30 was calculated, the true value $E_2=5.5\times10^6$ [Pa] was set; when the estimated stress value represented by the waveform G31 was calculated, a value different than the true value $E_2=3.5\times10^6$ [Pa] was set; and when the estimated stress value represented by the waveform G32 was calculated, a value different than the true value $E_2=7.0\times10^6$ [Pa] was set as the model parameter $E_2$.

As is apparent from a comparison between the waveform G30 in FIG. 7 and the waveform G10 in FIG. 5, it can be seen that if, in addition to the model parameters $E_1$ and η, the value of $E_2$ is a true value, the stress applied to the expansion/contraction sensor 20 represented by the waveform G10 is being accurately estimated. Then, as is apparent from a comparison of the waveforms G30, G31, and G32 in FIG. 7, as the deviation of the value of the model parameter $E_2$, provided to the signal processor 110A, from the true value becomes larger, the error between the estimated stress value calculated by the signal processor 110A and the stress that is applied to the expansion/contraction sensor 20 represented by the waveform G10 also becomes larger due to undershoot or overshoot. However, the error between the estimated stress value calculated by the signal processor 110A and the stress that is actually applied to the expansion/contraction sensor 20 represented by the waveform G10 is smaller for a deviation of the value of the model parameter $E_2$ that is provided to the signal processor 110A from the true value than for a deviation of the value of the model parameter $E_1$ from the true value.

Figure 8:
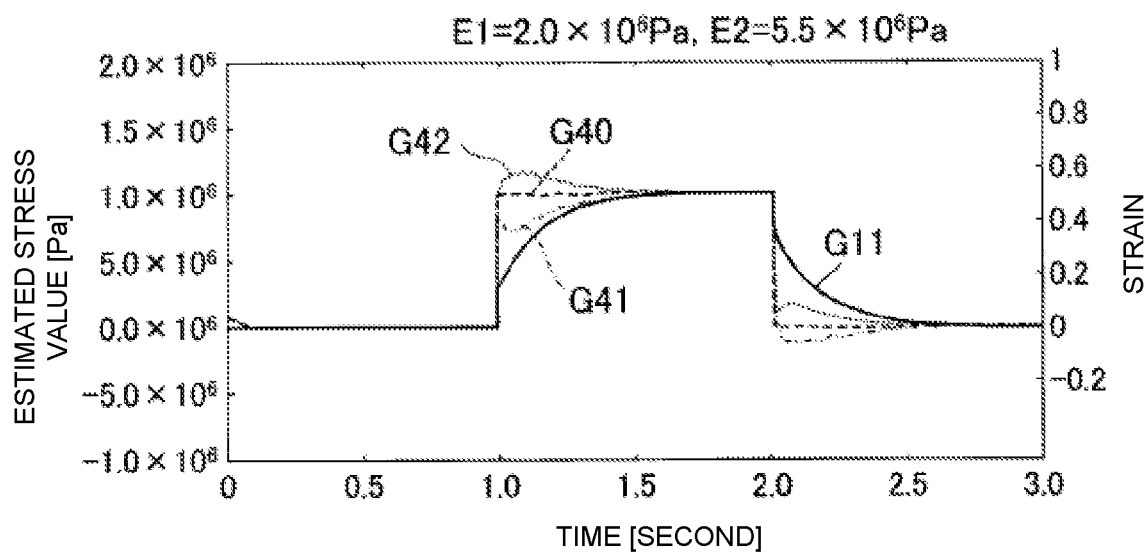
FIG. 8 is a view illustrating the simulation result.

FIG. 8 shows the waveform G11, as well as waveforms G40-G42, which represent estimated stress values. In the calculation of the estimated stress values in FIG. 8, a case was assumed in which the true values of the model parameters $E_1$ and $E_2$ are provided to the signal processor 110A. That is, in the calculation of the estimated stress value in FIG. 8, the model parameters $E_1$ and $E_2$ were set to $E_1=2.0\times10^6$ [Pa], and $E_2=5.5\times10^6$ [Pa].

In addition, in the calculation of the estimated stress values in FIG. 8, with respect to the signal processor 110A, when the estimated stress value represented by the waveform G40 was calculated, the true value η=$2.3\times10^5$ [Pa·s] was set; when the estimated stress value represented by the waveform G41 was calculated, a value different than the true value η=$1.1\times10^5$ [Pa·s] was set; and when the estimated stress value represented by the waveform G42 was calculated, a value different than the true value η=$3.2\times10^5$ [Pa·s] was set as the model parameter η.

As is apparent from a comparison between the waveform G40 in FIG. 8 and the waveform G10 in FIG. 5, it can be seen that, if, in addition to the model parameters $E_1$ and $E_2$, the value of η is the true value, the stress applied to the expansion/contraction sensor 20 represented by the waveform G10 is being accurately estimated. Then, as is apparent from a comparison between the waveforms G40, G41, and G42 in FIG. 8, as the deviation of the value of the model parameter η, provided to the signal processor 110A, from the true value becomes larger, the error between the estimated stress value calculated by the signal processor 110A and the stress that is applied to the expansion/contraction sensor 20 represented by the waveform G10 also becomes larger due to undershoot or overshoot. However, the error between the estimated stress value calculated by the signal processor 110A and the stress that is actually applied to the expansion/contraction sensor 20 represented by the waveform G10 is smaller for a deviation of the value of the model parameter η that is provided to the signal processor 110A from the true value than for a deviation of the value of the model parameter $E_1$ from the true value. In addition, the error between the estimated stress value calculated by the signal processor 110A and the stress that is actually applied to the expansion/contraction sensor 20 represented by the waveform G10 is larger for a deviation of the value of the model parameter η that is provided to the signal processor 110A from the true value than for a deviation of the value of the model parameter $E_2$ from the true value.

Figure 9:
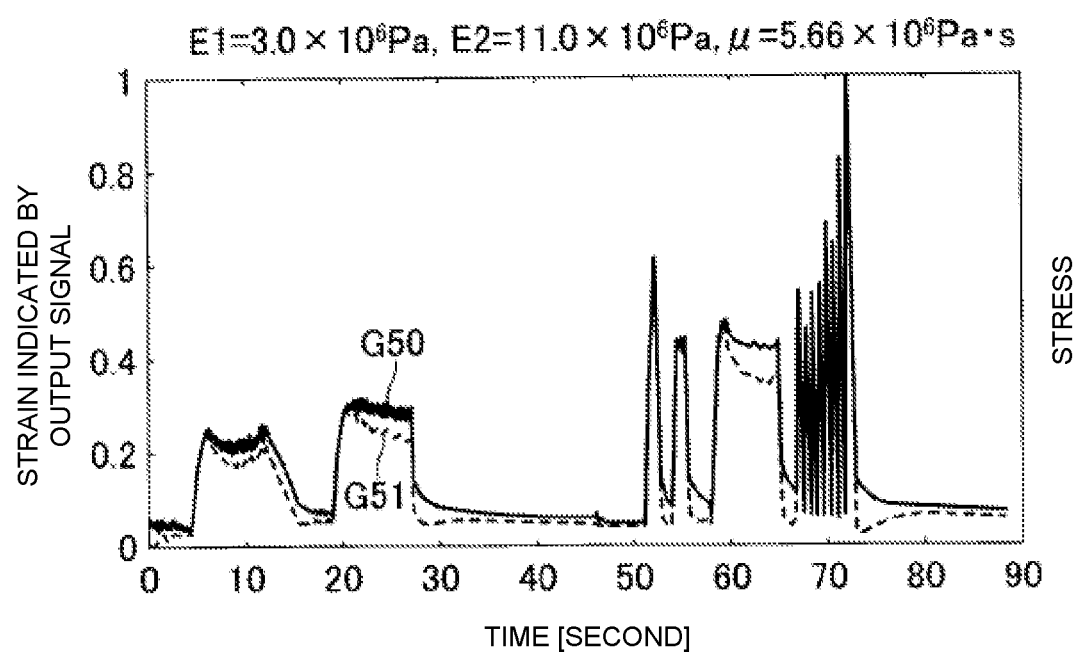
FIG. 9 is a view illustrating the result of applying the present embodiment to actually measured data.

FIG. 9 is a view illustrating actually measured data. Specifically, the waveform G50 in FIG. 9 indicates the strain generated in the expansion/contraction sensor 20, represented by the output signal that is output from the expansion/ contraction sensor 20. In addition, when the signal processor 10A corrects the output signal of the expansion/contraction sensor 20, the waveform G51 indicates the estimated value of the stress applied to the expansion/contraction sensor 20, represented by the corrected signal. In the calculation of the estimated stress value in FIG. 9, the model parameter values provided to the signal processor 110A were set to $E_1=3.0\times 10^6$ [Pa], $E_2=11.0\times 10^6$ [Pa], and $\eta=5.66\times 10^5$ [Pa·s].

As is apparent from a comparison between the waveform G51 in FIG. 9 and the waveform G11 in FIG. 5, the signal processing device 10A corrects the output signal from the expansion/contraction sensor 20, thereby eliminating the slowing down of the fall of the output signal.

As described above, in the present embodiment, for example, even when a fall of the output signal of the expansion/contraction sensor 20, due to the viscoelasticity of rubber, etc., provided in the expansion/contraction sensor 20, has occurred, the signal processor 110A corrects the signal lag in the fall of the output signal. Thus, according to the present embodiment, it becomes possible to accurately estimate the stress that is applied to the expansion/contraction sensor 20 and to improve the following ability during the contraction of the expansion/contraction sensor 20 compared with the prior art.

B: Second Embodiment

Figure 10:
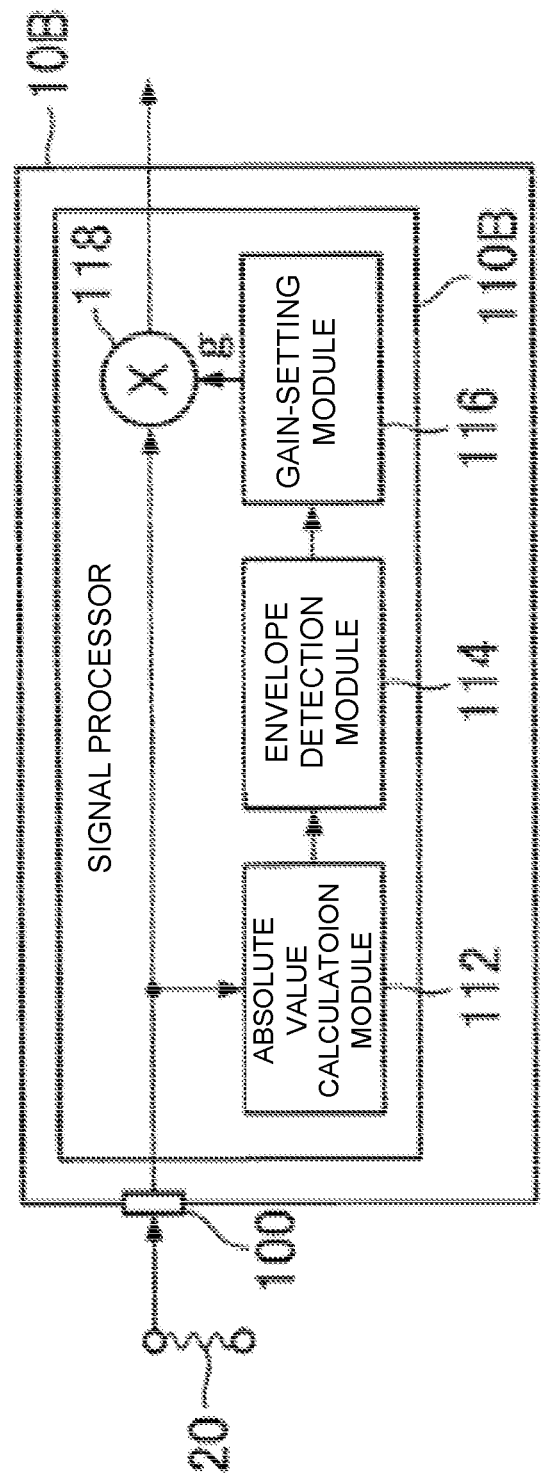
FIG. 10 is a view illustrating a configuration example of the signal processing system that includes a signal processing device 10B according to a second embodiment.

FIG. 10 is a view illustrating a configuration example of a signal processing device 10B according to a second embodiment. As is apparent from comparing FIG. 10 and FIG. 1, the configuration of the signal processing device 10B differs from the configuration of the signal processing device 10A in that a signal processor 110B is provided in place of the signal processor 110A. As shown in FIG. 10, the signal processor 110B is configured to execute a plurality of modules including an absolute value calculation module 112, an envelope detection module 114, a gain-setting module 116, and a multiplication module (multiplier) 118.

Figure 11:
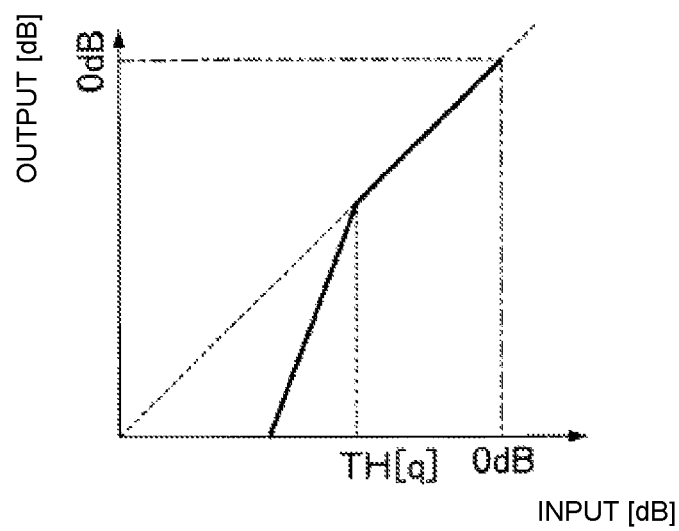
FIG. 11 is a view for explaining the storage contents of a gain table stored in a gain-setting module 116 of the signal processing device 10B.

The absolute value calculation module 112 calculates the absolute value of the amplitude of the output signal of the expansion/contraction sensor 20 and provides the value to the envelope detection module 114. The envelope detection module 114 detects the envelope of the output signal of the absolute value calculation module 112 and provides data representing the signal level of the envelope and the output signal of the absolute value calculation module 112 to the gain-setting module 116. The gain-setting module 116 determines an amplification factor according to a result of a comparison between a prescribed value and an amplitude of the envelope of the received signal received from the envelope detection module 114. The gain-setting module 116 reduces the amplification factor when the amplitude of the envelope of the received signal falls below a prescribed value. The gain-setting module 116 increases the amplification factor when the amplitude of the envelope of the received signal exceeds the prescribed value. Q gain tables TB[1]-TB[Q] (where Q is a non-negative whole number of at least 2) are provided to the gain-setting module 116. Threshold value TH[q] is set in the gain table TB[q] (where q is a non-negative whole number that satisfies 1≤q≤Q). Here, the Q threshold values TH[1]-TH[Q] are mutually different values. FIG. 11 is a view illustrating the storage contents of the gain table TB[q]. The gain values are prestored in the gain table TB[q], wherein a value set to the same value as the input value is output when the input value is greater than or equal to the threshold value TH[q], and a value set to a smaller value than the input value is output when the input value is less than the threshold value TH[q]. From gain tables TB[1]-TB[Q], the gain-setting module 116 selects the gain table TB[q] that has the threshold value TH[q] that corresponds to the envelope level provided from the envelope detection module 114. The gain-setting module 116 then sets a gain g, which is determined in accordance with the storage contents of the selected gain table TB[q] and the output signal value of the absolute value calculation module 112, in the multiplication module 118. The multiplication module 118 is an amplification module that adjusts the amplitude of the received signal according to the amplification factor. In particular, the multiplication module 118 amplifies and outputs the output signal of the expansion/contraction sensor 20 using the gain g set by the gain-setting module 116. The gain-setting module 116 and the multiplication module 118 are so-called expanders, which control the dynamic range of the output signal with respect to the input signal.

Figure 12:
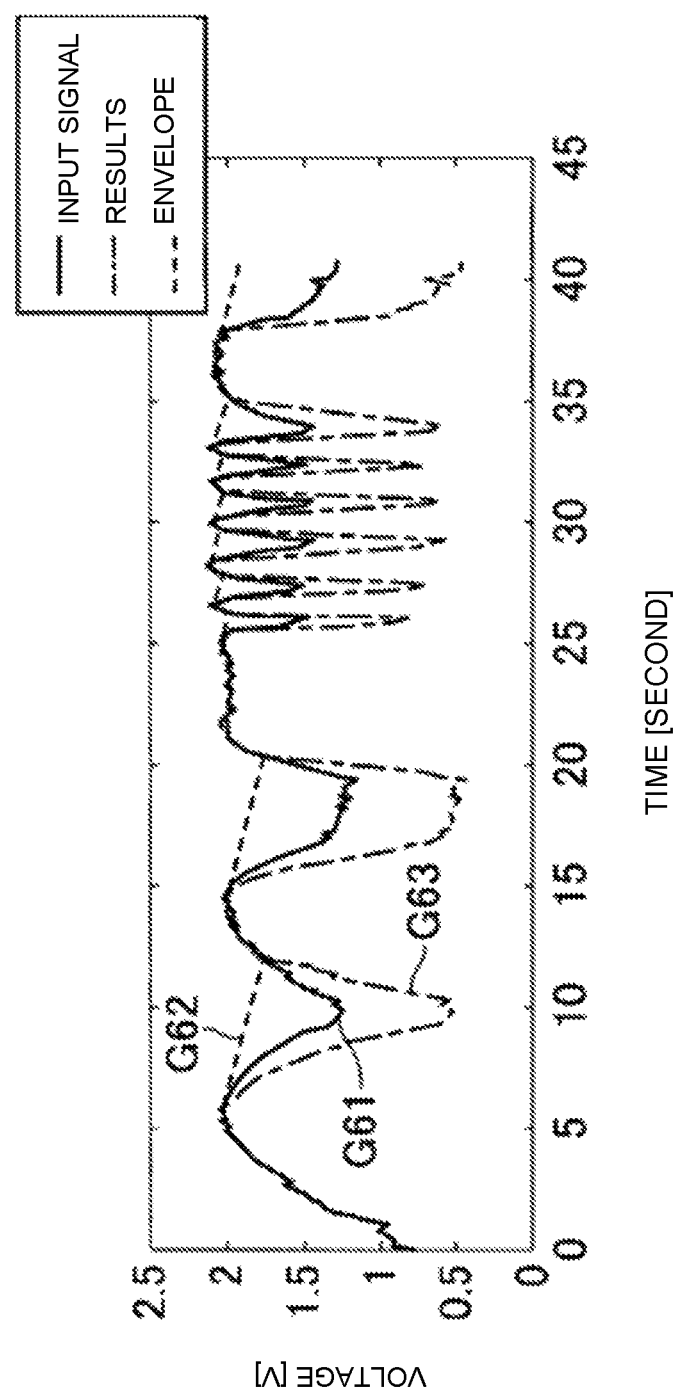
FIG. 12 is a view for explaining effects of the present embodiment.

FIG. 12 is a view for explaining the effects of the present embodiment. Waveform G61 in FIG. 12 represents the input signal waveform to the signal processing device 10B, and waveform G62 represents the input signal envelope. Waveform G63 in FIG. 12 represents the output signal waveform form the signal processing device 10B. As shown in FIG. 12, in the present embodiment, when the input signal to the signal processing device 10B falls below the envelope level, the gain of the amplifier that amplifies said input signal, that is, the amplification factor, is decreased and the falling edge of the output signal of the signal processing device 10B becomes steep. As a result, even if there is a lag in the fall of the output signal of the expansion/contraction sensor 20, the lag is corrected, and the following ability of the output signal that is output from the signal processing device 10B with respect to the contraction of the expansion/contraction sensor 20 can be improved compared to the prior art. The reason for setting the gain g based on the envelope of the output signal of the expansion/contraction sensor 20 in the present embodiment is because, since the output signal of the expansion/contraction sensor 20 itself changes too abruptly, there is the possibility that the output of the signal processing device 10B will become erratic.

In the first embodiment described above, in order to accurately estimate the stress applied to the expansion/contraction sensor 20, it is necessary to set the model parameters $E_1$, $E_2$, and $\eta$ to values at or near the true values; for this purpose, it becomes necessary to measure the physical constants that correspond to these model parameters. In the present embodiment, on the other hand, it is not necessary to measure the above-described physical constants, etc.; thus, it is possible to reduce the prior preparation time compared with the first embodiment. In addition, the present embodiment also achieves the effect of improving the following ability at the time of a contraction with fewer calculations compared to the first embodiment.

C: Modification

Despite the descriptions of the first and second embodiments presented above, the embodiments can be modified as follows.

(1) The expansion/contraction sensor 20 of the embodiments described above is a CNT strain sensor; however, it can also be a braid-based sensor, as disclosed in Shinya Namikawa and two others "Basic Investigation of Braid-Based Sensor Using Resistance Change in Response to Stretching," Interaction 2016. This is because a time lag (signal lag) also occurs in the changes of the waveform of the signal at the time of contraction of a braid-based sensor due to the structure thereof. In addition, in the embodiments described above, a case was explained in which a lag in the falling edge of the output signal of the expansion/contraction sensor 20 is corrected; however, the embodiments can be applied to any sensor in which an output signal rises in response to a physical change, and the output signal falls in response to a physical change that is the opposite of said physical change, and the falling of the output signal lags relative to the rising thereof caused by said structure, in order to eliminate the asymmetry in the output signal.

In addition, in the embodiments described above, signal processing devices 10A and 10B that can eliminate the asymmetry in the output signal when the falling edge of the output signal of the expansion/contraction sensor 20 is slowed down relative to the rising edge thereof were exemplified, but the embodiments are not limited to such a mode. It is also possible to eliminate the asymmetry in the output signal even when the rising edge of the output signal of the expansion/contraction sensor 20 is slowed down relative to the falling edge thereof.

For example, the signal processing device 10A according to the first embodiment is also able to eliminate the asymmetry in the output signal of a sensor in which there is a time lag(signal lag) in the rising of the output signal relative to the falling thereof.

In addition, with the signal processing device 10B according to the second embodiment, instead of a reduction in the amplification factor of the multiplication module 118, which is the amplifier, when the amplitude of the envelope of the signal received by the receiver 100 falls below a prescribed value, the amplification factor of the amplifier can be increased when the amplitude of the envelope of the signal received by the receiver 100 exceeds a prescribed value. In this case, the signal processing device 10B is able to eliminate the asymmetry in the output signal of a sensor in which the rising of the output signal is slowed down relative to the falling thereof.

(2) In the first and second embodiments described above, a signal processing device according to one embodiment was described. However, a program can be provided which causes a general computer, such as a CPU (Central Processing Unit), to execute a signal processing method, in which an output signal is received from a sensor that outputs a signal that rises in response to a physical change and that falls in response to a physical change that is the opposite of said physical change, and that either the rising edge is slowed down relative to the falling edge or the falling edge is slowed down relative to the rising edge, and in which said slowing down is corrected. Conceivable specific implementations of such a program include a mode in which the program described above is written and distributed in a computer-readable non-transitory storage medium, such as a flash ROM (Read Only Memory), and a mode in which the program described above is distributed by means of downloading via an electric communication line, such as the Internet. By means of operating a general computer using the program distributed in this manner, it is possible to cause said computer to function as the signal processing device.

Preferred Aspects

Preferred aspects that can be ascertained from the descriptions of the embodiment and the modified example above are illustrated below.

A signal processing method according to a first aspect comprises a step for receiving a signal from a sensor that outputs a signal that rises in response to a physical change and falls in response to a physical change that is the opposite of the physical change, and a step for correcting a time lag when either the rising edge is slowed down relative to the falling edge or the falling edge is slowed down relative to the rising edge.

By means of this aspect, it is possible to eliminate the asymmetry in the output signal of the sensor.

The signal processing method according to a second aspect is characterized in that, in the signal processing method according to the first aspect, the physical change is a change in the electrical resistance of an object provided in the sensor.

By means of this aspect, when the change in the electrical resistance of the object using the sensor is measured, the physical change can be measured accurately.

The signal processing method according to a third aspect is characterized in that, in the signal processing method according to the first or second aspect, in the correcting step, the signal lag is corrected using a Kalman filter.

By means of this aspect, it is possible to eliminate the asymmetry in the output signal of the sensor.

The signal processing method according to a fourth aspect is characterized in that, in the signal processing method according to the first or second aspect, the correcting step includes a step for determining an amplification factor according to the result of a comparison between a prescribed value and the amplitude of the envelope of the received signal, and a step for adjusting the amplitude of the received signal according to the amplification factor.

By means of this aspect, it is possible to eliminate the asymmetry in the output signal of the sensor.

The signal processing method according to a fifth aspect is characterized in that, in the signal processing method according to the fourth aspect, the falling edge of the signal is slowed down relative to the rising edge of the signal, and, in the correcting step, the amplification factor is reduced when the amplitude of the envelope of the received signal falls below a prescribed value.

By means of this aspect, it is possible to eliminate the asymmetry in the output signal of the sensor.

The signal processing method according to a sixth aspect is characterized in that, in the signal processing method according to the fourth aspect, the rising edge of the signal is slowed down relative to the falling edge of the signal, and, in the correcting step, the amplification factor is increased when the amplitude of the envelope of the received signal exceeds a prescribed value.

By means of this aspect, it is possible to eliminate the asymmetry in the output signal of the sensor.

A signal processing device according to a seventh aspect comprises a receiving means for receiving a signal from a sensor that outputs a signal that rises in response to a physical change and falls in response to a physical change that is the opposite of the physical change, and a signal processing means for carrying out a process for correcting a time lag when either the rising of the signal received by the receiving means is slowed down relative to the falling of the signal received by the receiving means or the falling of the signal received by the receiving means is slowed down relative to the rising of the signal received by the receiving means.

According to this aspect, it is possible to eliminate the asymmetry in the output signal of the sensor, and when physical changes using the sensor are measured, the following ability of the corrected signal with respect to the physical change can be improved.

What is claimed is:

1. A signal processing method, comprising:
    receiving a signal that rises in response to a physical change and falls in response to an opposite physical change that is opposite to the physical change from a sensor that outputs the signal; and
    correcting a signal lag as either a rising of a received signal that has been received from the sensor lags with respect to a falling of the received signal or the falling of the received signal lags with respect to the rising of the received signal,
    the signal lag being corrected using a Kalman filter.

2. The signal processing method according to claim 1, wherein
    the physical change and the opposite physical change are changes in electrical resistance of an object disposed in the sensor.

3. A signal processing method, comprising:
    receiving a signal that rises in response to a physical change and falls in response to an opposite physical change that is opposite to the physical change from a sensor that outputs the signal; and
    correcting a signal lag as either a rising of a received signal that has been received from the sensor lags with respect to a falling of the received signal or the falling of the received signal lags with respect to the rising of the received signal,
    the correcting including
    determining an amplification factor according to a result of a comparison between a prescribed value and an amplitude of an envelope of the received signal, and
    adjusting an amplitude of the received signal according to the amplification factor.

4. The signal processing method according to claim 3, wherein
    the falling of the received signal lags relative to the rising of the received signal, and
    in the correcting, the amplification factor is reduced in response to the amplitude of the envelope of the received signal falling below the prescribed value.

5. The signal processing method according to claim 3, wherein
    the rising of the received signal lags relative to the falling of the received signal, and,
    in the correcting, the amplification factor is increased in response to the amplitude of the envelope of the received signal exceeding the prescribed value.

6. The signal processing method according to claim 3, wherein
    the physical change and the opposite physical change are changes in electrical resistance of an object disposed in the sensor.

7. A signal processing device, comprising:
    a receiver configured to receive a signal that rises in response to a physical change and falls in response to an opposite physical change that is opposite to the physical change from a sensor that outputs the signal; and
    a signal processor configured to correct a signal lag as either a rising of a received signal received by the receiver lags with respect to a falling of the received signal, or the falling of the received signal lags with respect to the rising of the received signal, the signal processor being configured to correct the signal lag by using a Kalman filter.

8. The signal processing device according to claim 7, wherein
    the physical change and the opposite physical change are changes in electrical resistance of an object disposed in the sensor.

9. A signal processing device, comprising:
    a receiver configured to receive a signal that rises in response to a physical change and falls in response to an opposite physical change that is opposite to the physical change from a sensor that outputs the signal; and
    a signal processor configured to correct a signal lag as either a rising of a received signal received by the receiver lags with respect to a falling of the received signal, or the falling of the received signal lags with respect to the rising of the received signal,
    the signal processor being configured to execute a plurality of modules including
    a gain-setting module that determines an amplification factor according to a result of a comparison between a prescribed value and an amplitude of an envelope of the received signal, and
    a multiplication module that adjusts an amplitude of the received signal according to the amplification factor.

10. The signal processing device according to claim 9, wherein
    the falling of the received signal lags relative to the rising of the received signal, and
    the gain-setting module reduces the amplification factor in response to the amplitude of the envelope of the received signal falling below the prescribed value.

11. The signal processing device according to claim 9, wherein
    the rising of the received signal lags relative to the falling of the received signal, and,
    the gain-setting module increases the amplification factor in response to the amplitude of the envelope of the received signal exceeding the prescribed value.

12. The signal processing device according to claim 9, wherein
    the physical change and the opposite physical change are changes in electrical resistance of an object disposed in the sensor.

* * * * *